June 16, 1931.  L. CAMPBELL, JR  1,810,158
WELDING TORCH CONSTRUCTION
Original Filed Jan. 12, 1925  2 Sheets-Sheet 1
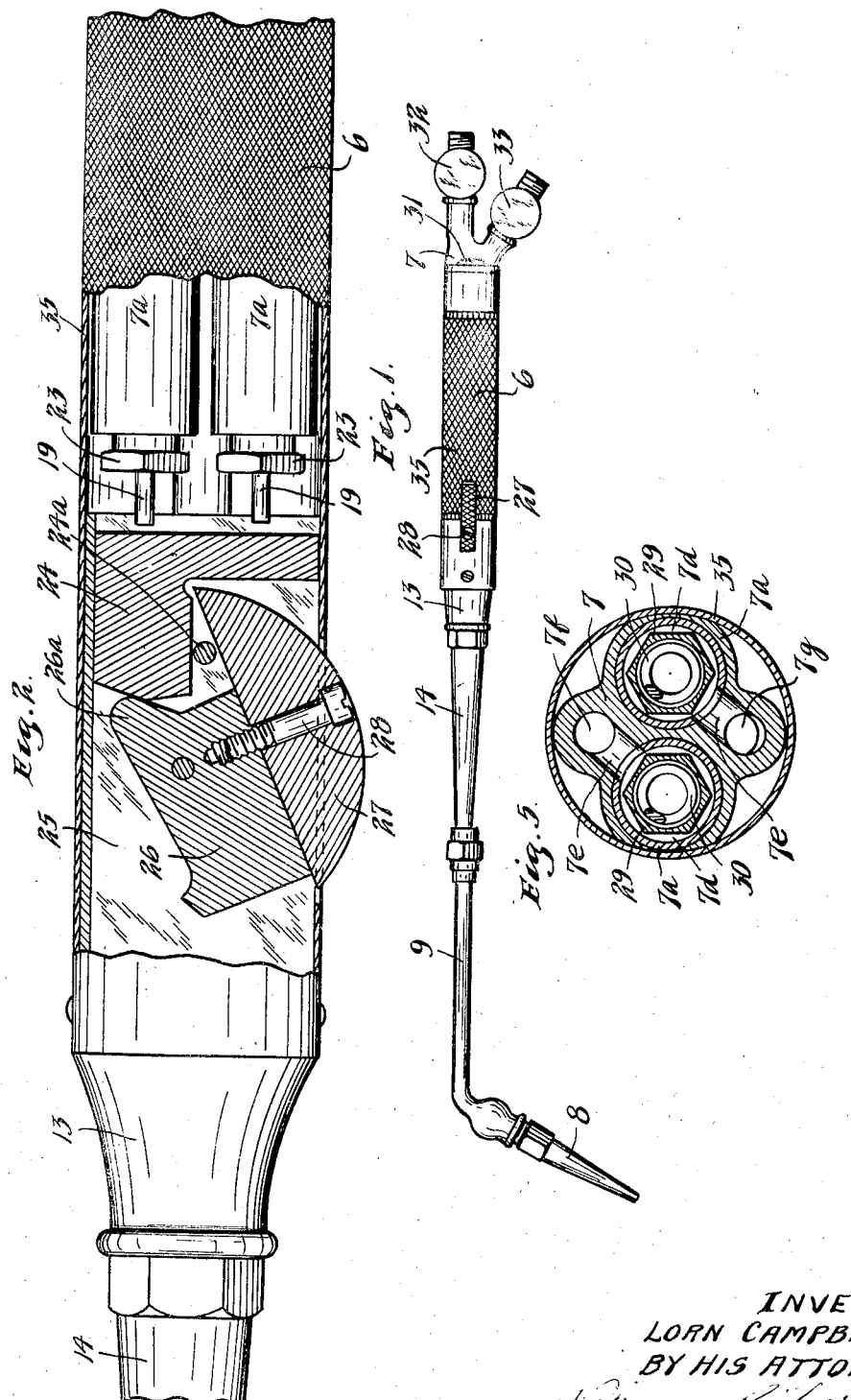
INVENTOR.
LORN CAMPBELL JR.
BY HIS ATTORNEYS.

June 16, 1931.  L. CAMPBELL, JR  1,810,158
WELDING TORCH CONSTRUCTION
Original Filed Jan. 12, 1925  2 Sheets-Sheet 2
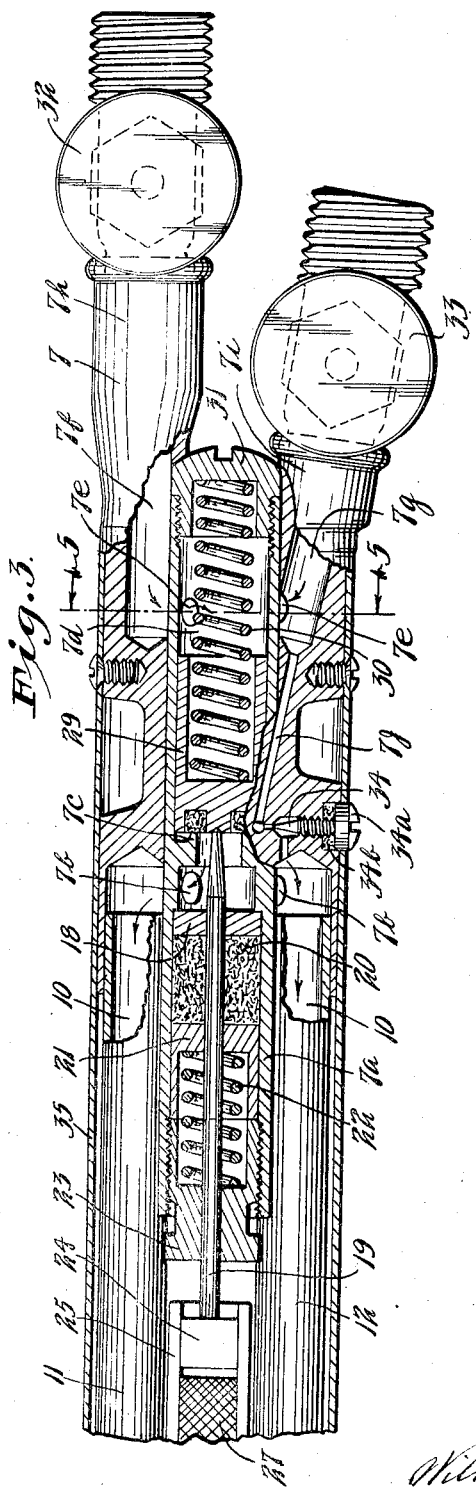
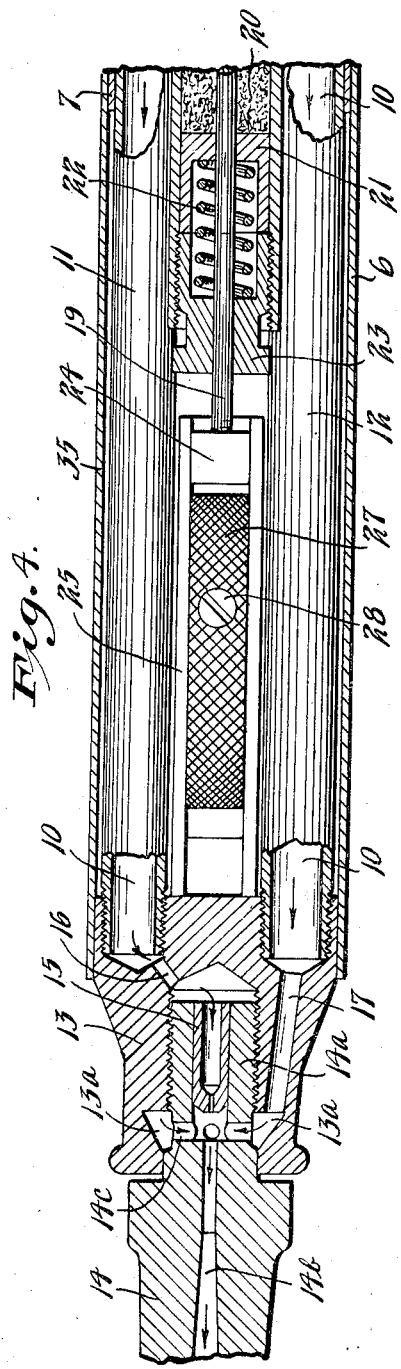
Inventor
John Campbell Jr.
By his Attorneys
Williamson & Williamson Patented June 16, 1931

1,810,158

UNITED STATES PATENT OFFICE

LORN CAMPBELL, JR., OF CLEVELAND, OHIO

WELDING TORCH CONSTRUCTION

Continuation of application Serial No. 1,847, filed January 12, 1925. This application filed April 18, 1929. Serial No. 356,270.

This invention relates to a torch and while the invention may be applicable to various torches and burners it particularly is designed for use in a welding or cutting torch employing a combustible gas, such as acetylene and a cumbustion supporting gas such as oxygen, which oxygen is usually supplied under considerable pressure.

Such welding and cutting torches are now largely used in the arts mostly for welding and cutting iron and steel and other metal members. The combustion of the gases at the tip or nozzle of the torch produces a flame which must be properly and very accurately regulated. The adjustment of the proper flame for welding is of extreme importance. Regulating valves constructed and arranged to maintain a fine and accurate adjustment must be provided for the two gases respectively. The flame at the tip of the torch has therein a bright cone which when the flame is properly regulated has its sides substantially parallel and has a rounded end, the periphery of the cone being sharply defined. This is called the neutral flame and is the proper flame for welding. This flame is characteristic of the oxyacetylene art and differs vastly from that formed in blow pipes using city gas and compressed air now commonly employed in hard and soft welding as in the jewelry art. If there is an excess of acetylene supplied the cone takes on a feathered appearance at its periphery and a carbonizing flame is produced. Such a flame will deposit carbon in the weld and metal making the metal hard and making the weld liable to break as well as rendering the metal hard to machine. If there is an excess of oxygen supplied, said cone becomes sharply pointed and an oxidizing flame is produced which will oxidize the metal, such oxidization being very objectionable. Regulating valves, therefore, which can be adjusted very finely or with great accuracy are very necessary. In operation the torches are intermittently used and are thus frequently laid aside for short intervals. Applicant's torch is provided with a small pilot flame which burns while the torch is thus temporarily out of operation and a pair of controlling valves are thus desirable which can be quickly and easily operated to restore the full operation of the torch when its operation is to be resumed after an interval of non-use. It will be seen that it is highly desirable to be able to maintain the adjustment of the gases to produce the proper flame after the adjustment has once been secured. The regulating valves, therefore, should be at the end of the torch nearest the source of supply of the two gases. With the control valves thus placed between the regulating valves and the delivery tip of the torch, the regulating valves can be left in their positions of adjustment to give the proper flame, while the torch is extinguished and its operation resumed by actuation of the control valves.

It is quite important also in the functioning of the torch to have the regulating valves at the rear end. If the regulating valves were placed in front of the control valves and the latter should leak gas through or past the valves the gases might become ignited. There would then be no means of closing off the gas from the source of supply and the torch would take fire and serious damage would occur. By having the regulating valves at the rear end of the torch even if the gas should leak so as to become ignited at or in the rear of the control valves the operator could close the regulating valve and thus shut off the supply of gas and extinguish the torch.

It is also desirable to have a torch which is compact and convenient to hold and manipulate.

It is also desirable to have the control valves and the closing means therefor housed so that no dirt can find its way to these valves. It is very important that the control valves seat properly. If there is the slightest leak in the oxygen valve, the oxygen, which is under high pressure, will rush to the tip and blow out the pilot flame which is maintained at the tip even if this portion of oxygen be extremely small. If the acetylene valve is not closed tightly a surplus of acetylene will be furnished to the tip and a larger pilot will be carried than is necessary or desirable. If a surplus of acetylene passes to the nozzle or tip the pilot is not only larger than necessary, but a very sooty and smoky flame is produced causing an objectionable deposit of carbon at the tip of the torch. The pilot flame normally is about the size of a small pea and secures enough oxygen from the atmosphere for complete combustion.

In a torch having the control valves in front of the regulating valves, when the control valves are closed and the regulating valves adjusted the pressure builds up in the torch between the two sets of valves on account of the high pressure of oxygen carried in the hose lines which supply oxygen. On account of this building up of the pressure it is highly desirable to have a passage of considerable diameter in fact, of as large a diameter as is practicable, for the gases particularly the oxygen, to pass from the control valves to the mixing chamber where the gases are mixed or co-mingled to form a combustible mixture. By having such large diameter of passage the gases can expand and the velocity thereof be reduced prior to the gases reaching the mixing chamber. It is also desirable to have a restricted passage, leading from this passage of large diameter, through which the oxygen passes to the mixing chamber.

It is an object of this invention to provide a torch having a very simple, compact, convenient and efficient structure.

It is a further object of this invention to provide a torch comprising a main body portion having an end member or end casting secured thereto at its rear end in which end member are disposed a plurality of valves for controlling the gases used by the torch.

It is another object of the invention to provide a torch comprising a main body portion having an end member or casting secured thereto in which is disposed a plurality of spring-pressed controlling valves for the gases, said body portion having a means therein, and projecting slightly at one side thereof, for operating said valves.

It is still a further object of the invention to provide a torch comprising a main body portion having an end member at the rear end thereof, a pair of spring-pressed controlling vavles disposed in said member and said torch also having a pair of regulating valves for the gases supplied thereto.

It is still another object of the invention to provide a torch comprising a main body portion having an end member secured thereto at its rear end having a plurality of passages extending therethrough, each of which passages has a spring-pressed valve movable therein and each of which passages is closed by a removable plug secured in the rear of said end member whereby ready access may be had to said valves from the exterior of said torch.

It is also another object of the invention to provide a torch as set forth in the preceding paragraph, together with operating means for said valves comprising plungers carried in said main body portion adapted to contact the valves, and a movable member in said body portion for operating said plungers.

It is a further object of the invention to provide a torch comprising a main body portion having means at its end in which are disposed a pair of regulating valves for the gases, and in front of which are disposed a pair of control valves, said torch having a mixing chamber some distance forward of said control valves and large passages extending respectively from said control valves to said mixing chamber whereby expansion of the gases passing from the said control valves to said mixing chamber is secured.

It is still another object of the invention to provide a torch using acetylene and oxygen comprising a mixing chamber, a pair of control valves, passages extending from said control valves to said mixing chamber of comparatively large diameter, a small passage connecting one of said last mentioned passages to the mixing chamber through which the oxygen passes to the mixing chamber and a much larger opening from the other of said passages to the mixing chamber through which the acetylene passes to the mixing chamber.

These and other objects and advantages of the invention will be fully set forth in the following description made in connection with the accompanying drawings in which like reference characters refer to the same parts throughout the different views, and in which:—

Fig. 1 is a plan view of the complete torch;

Fig. 2 is a view in side elevation of a portion of the torch, certain parts being broken away and other parts shown in vertical section;

Fig. 3 is a view partly in side elevation of the torch and partly in horizontal section thereof;

Fig. 4 is a view partly in plan and partly in horizontal section of a portion of the torch; and Fig. 5 is a view in vertical section taken substantially on the line 5—5 of Fig. 3, Figs. 2 to 5 being on an enlarged scale.

Referring to the drawings, particularly Fig. 1, it will be seen that the torch comprises a main body portion 6, a rear end portion 7, a tip portion 8 and conduits 9 and 14 connecting the tip portion to the front part of the main body portion. Said main body portion comprises a pair of passages 10 extending longitudinally thereof and in the embodiment of the invention illustrated these passages are formed by the hollow cylindrical members or tubes 11 and 12 which are secured in any suitable manner, as by brazing, to the front portion of the rear end member 7. The tubes 11 and 12 are secured at their forward end to a member 13 in any suitable manner, as by being threaded therein. Passages 10 in tubes 11 and 12 are of large diameter. The members 13 and 14 are arranged to form a mixing chamber and member 13 is bored and threaded to receive a cylindrical portion 14a, formed on the inner end of the pipe or tube 14 which is, in turn, bored and has secured therein a small hollow plug or injector nozzle 15 having a central passage therethrough communicating with a chamber in the rear of portion 14a, which chamber is connected to the passage through tube 11 by a hole or passage 16, the latter being quite small. The member 15 has a small central opening in its forward end directed outwardly of the torch and in axial alignment with an opening or passage 14b extending centrally through the member 14, said passage 14b flaring outwardly of member 14. The member 13 is also provided with an annular passage 13a and the member 14 has a plurality of radially disposed holes 14c of larger diameter than passage 16 formed therein communicating with the annular passage 13a which communicates with the central passage 14b. The annular chamber 13a is connected to a passage 10 in tube 12 by a passage 17 formed in the member 13. The opening 14b communicates with a quite large central opening extending through the pipe 9 and which tapers in tip 8.

The end piece 7 is, in practice, made as a casting and the same has extending forwardly therefrom a pair of sleeves of tubelike portions 7a. In the rear portion of the members 7a are laterally extending passages or openings 7b, which connect the interior of the sleeve 7a, respectively, with the passages 10 in the members 11 and 12. The sleeves 7a are provided with a shoulder adjacent the holes 7b against which fit blocks or washers 18 which are apertured to have slidably movable therethrough the plungers 19. Packing material 20 is placed in front of the blocks or washers 18 in each of the sleeves 7a, which packing material is pressed upon by members 21 slidable in the sleeves 7a. The members 21 are cup-shaped and adapted to receive one end of coiled compression springs 22, which latter surround, respectively, the plungers 19 and have their other ends seated in the cup-shaped ends of the threaded packing glands 23 through which the plungers 19 also are adapted to slide. Plungers 19 have their ends spaced different distances from the block 24, which is slidable longitudinally of the torch in a U-shaped guiding member 25 extending across the main body portion and abutting at its front end against the rear end of the member 13. The member 24 is shaped in vertical cross section, as shown in Fig. 2, and this front end is provided with surfaces disposed at an angle to each other adapted to be contacted by the rounded end of a portion 26a of an oscillating block 26 pivoted between the sides of member 25. Member 26 has a flat side to which is secured a narrow segmental member 27, as by the countersunk screw 28, which member 27 has its curved surface projecting beyond the side of the main body portion 6 of the torch and has this outer curved surface knurled or roughened. The movement of the member 27 in one direction is limited by a pin 24a extending between the sides of the member 25.

The passages through the sleeves 7a are reduced slightly to the rear of the hole 7b and said sleeves have formed therein rearwardly directed annular valve seats 7c. Valve members 29 which have their peripheries of polygonal shape in cross section, such as the hexagonal shape shown in Fig. 5, are slidable in cylindrical passages 7d formed in the member 7 co-axially with the sleeves 7a. The valves 29 have annular-shaped packing material, such as fiber or rubber, set into their faces adapted to contact with the valve seat 7c to tightly close the passage into the sleeve 7a. Said valves 29 have small recesses in their forward ends which are engaged by the pointed rear ends of the plungers 19. The rear ends of the valve members 29 are cup-shaped or recessed to receive respectively the front end of compression coiled springs 30, the rear ends of which are seated in the recessed or cup-shaped ends of headed and slotted plugs 31 threaded into the rear end of the member 7. Between the valves 29 and the plugs 31, the passages 7d have holes 7e extending therefrom communicating, respectively, with passages 7f and 7g formed in the member 7 and extending through projections 7h and 7i formed on the member 7, which projections have disposed transversely therein regulating valves 32 and 33 adapted to open and close the passages 7f and 7g, respectively. Valves 32 and 33 have operating wheels therein and finely threaded valve stems. The valves are carefully packed and constructed and arranged to be capable of very fine and accurate adjustment and to maintain such adjustment. The rear ends of the members 7h and 7i are threaded and adapted, respectively, to receive the connections to the members supplying the oxygen and acetylene. The passage 7g has extending from its front end a small passage 7j having a right angle portion at its forward end and which communicates with the passage 10 into the tube 12. The right angle portion of passage 7j is formed as a valve seat with which a needle valve 34 cooperates, said valve having a finely threaded stem provided with a slotted head 34a which projects through the side of the torch and can thus be easily and accurately adjusted. Packing material 34b is disposed in a recess surrounding valve 34 and compressed thereby. The member 7 and the body portion of the torch are enclosed in the shell or casing 35, secured by suitable screws to the member 7 and the member 13, which members are overlapped somewhat by said casing. Said casing preferably has its exterior knurled or roughened.

In operation, the connection to the source of acetylene supply is made to the member 7i and the connection to the source of oxygen supply is made to the member 7h. The relative quantities of oxygen and acetylene supplied are regulated by the valves 32 and 33 so that the desired size and character of flame at the nozzle of the torch are secured. As previously set forth, a very accurate and minute adjustment of valves 32 and 33 is absolutely necessary. The gas passes into the respective passages 7d through the holes 7e and the openings from these passages into the sleeves 7a normally are closed by the valves 29 which are pressed firmly against their seats by the springs 30. The torch is grasped in the hand about the knurled portion of the casing 35, so that the thumb is in convenient position over the curved surface of the member 27. When the torch is connected for use and the valves 33 and 32 regulated, a small portion of acetylene or other combustible gas will pass from the passage 7g through the passage 7j into passage 10 of tube 12 and hence, to the tip. This small portion of acetylene will be lighted and will form a pilot flame. The size of the pilot can be regulated by the valve 34. When it is desired to use the torch, the operator will merely press the member 27 forwardly with his thumb. This will move the rounded projection 26a rearwardly and the same will move onto the inclined surface at the front end of block 24 nearest to member 27. The member 24 will thus be moved rearwardly of the torch and will contact the ends of plungers 19, which plungers will be moved rearwardly and will press open the valves 29 against the tension of springs 30. Members 26 and 27 swing past a dead center and are thus locked in position with the valves 29 open. It will be noted that the plunger 19 which controls the opening into the passage 10 and tube 12 will first be contacted by the block 24 and that the other plunger 19 will be contacted shortly thereafter. This results in opening the valve controlling the acetylene first so that a full supply of acetylene is delivered to the nozzle before a full supply of oxygen. If the valves were simultaneously opened the oxygen would, on account of its high pressure, rush to the tip and the pilot would be blown out so that the torch will have to be re-lighted. When the member 27 is thus moved the gases are supplied to the nozzle in the desired proportions and the desired flame is produced. When it is desired to discontinue the use of the torch temporarily, the member 27 is moved in the opposite direction by the thumb of the operator. The valves 29 are moved against their seats by the springs 30, thus again pushing the plungers forwardly. It will be noted that in the reverse movement of the block 24 the plunger controlling the opening into passage 10 of the tube 11 will first be disengaged from the block 24. The valve 29 controlling the oxygen will, therefore, first be closed and the valve 29 controlling the acetylene will be closed shortly thereafter. This is desirable for the reasons set forth above, that if the oxygen valve were last to close the high pressure thereof is apt to blow out the pilot light. It will be noted that after valve 29 which controls the acetylene is closed there is still a passage allowed for a small amount of acetylene to form the pilot. The flame is thus not entirely extinguished but a small flame is left burning at the nozzle.

The present structure is quite an improvement over that disclosed in the prior application in the disposition of the controlling valves 29 and the operating means therefor. The valves 29 and their operating springs are disposed wholly within and enclosed by the end casting 7. Ready access from the exterior of the torch to these valves is, however, possible by merely removing the threaded plugs 31. It will be noted that the polygonal shape of the valves 29 permits the gases to pass therearound from the holes 7e through the valve opening. The valves and their closing springs can be readily removed and any replacement of the valves, or any cleaning of the seats 7c, necessitated by foreign particles lodging therein, can be easily performed. The packing 20 insures that there will be no escape of gas past the operating plungers 19. By the described structure, the controlling valves and the operating plungers therein are all disposed inside of the torch and the operating member 27 is largely disposed in the torch. A very simple, compact and efficient device is thus produced.

It will be noted that due to the fact that the control valves and operating means therefor are housed within the body portion of the torch it is necessary to have the packing for the plungers 19 operated by the springs 22. The plungers 19 are made of a very fine imported steel free from any small pits so that no gas can leak along the plungers. The springs 22 are made quite strong. Before the board of insurance underwriters would approve the torch it was required that the torch function one million times under pressure. This test was complied with and the plungers were operated one million times, with the torch submerged in water and under a pressure of eighty pounds. The test was observed so that if any gas leaked past the packing 20 it would be seen as bubbles rising to the surface of the water in which the torch was submerged. The test of a million operations was successfully made and the spring pressed packing functioned perfectly, no gas escaping. The torch was then approved by the underwriters. There has been no previous occasion in the art to have such spring pressed packing for an operating mechanism for valves controlling inflammable gases in the handle of a torch.

The fact that the operating member 27 for the control valves locks in position with the valves open relieves the operator of any strain or effort in holding the valves open during the welding operation.

The torch is very safe and efficient in operation. In the use of such a torch the operator usually holds the torch in the right hand and holds a filler rod in the left hand which is used to supply extra metal to the weld. Sometimes in welding in a very confined space the tip of the torch will become red hot from the reflected heat of the weld and the gasses passing to the tip will be pre-ignited thus causing a back fire and the flame pops back to the mixing chamber where the gases burn. The torch must be quickly extinguished under such conditions or it will be melted and destroyed, as the brass of the torch is much more fusible than steel and the flame is hot enough to melt steel. In previous torches it was necessary for the operator to drop the filler rod and reach with one hand for the shut-off valve of the oxygen. When this was closed the acetylene valve would be closed and the torch extinguished. The torch would have to be re-lighted, which required opening the acetylene valve and lighting the torch at the tip. The oxygen valve would then be opened and both valves repeatedly manipulated to again secure proper adjustment of the flame. The operator would then have to hunt and pick up the filler rod. All of this caused trouble and consumed a lot of time. The torch might also back fire if the operator carelessly brought the tip down in direct contact with the melted metal. With applicant's torch in the case of such a back fire the operator merely moves member 27 and the gases are shut off at the control valves and the torch extinguished. This is a simple operation and a great advantage in the art of the prior torches. The torch can be quickly relighted without any readjustment of the flames.

When the control valves are closed the pressure tends to build up in the torch between the control valves and regulating valves due to the high pressure that the oxygen is under. When the control valves are opened, if the pressure has thus been built up the gases would tend to rush to the mixing chamber. In the present structure the passages 10 and the tubes 11 and 12 are made quite large and when the control valves are opened the gases pass into these tubes and expand to a great extent so that the velocity of the gases is greatly cut down. It will be noted that the passage 16 through which the oxygen passes to the mixing chamber is quite small, while the passages 13a through which the acetylene passes are comparatively large. The acetylene is really sucked through the mixing chamber or injected through by the oxygen passing through member 15. With the described arrangement of passages and openings the proper function of the mixing chamber and the co-mingling of the gases is secured regardless of the fact that the pressure does tend to build up in the torch between the control valves and the regulating valves. As stated the oxygen is, so to speak, dammed up in its passage 10 by the small opening 16 and cannot rush on at once to the mixing chamber.

From the above description it is seen that applicant has provided a simple, neat and compact structure of welding torch. The parts are not only compactly and conveniently arranged, but are so constructed that the perfect functioning of the torch is obtained and the torch rendered safe for the operator. The parts are comparatively few and simple and the torch is easily made and assembled. The same has been amply demonstrated in actual practice and found to be very successful and efficient and is being commercially marketed.

This application is a continuation of applicant's copending application for welding torch construction, filed on January 12th, 1925, S. N. 1,847.

It will, of course, be understood that various changes may be made in the form, details, arrangement and proportions of the parts without departing from the scope of applicant's invention, which, generally stated, consists in the novel parts and combinations of parts disclosed and defined in the appended claims.

and rear ends, a mixing chamber in the front end of said body portion, a tip carrying member comprising a single conduit at-

What is claimed is:—

1. A torch member having in combination, a body or handle portion having front tached to the front end of said portion, an end casting attached to the rear end of said portion, a plurality of regulating valves carried by said casting having operating handles and constructed and arranged for fine and accurate adjustment and to maintain such adjustment, a plurality of control valves wholly disposed in said end casting between said body portion and said regulating valves, passages extending from said control valves to said mixing chamber, said casting having spaced members projecting therefrom adapted to receive flexible gas supplying conduits, means disposed in said body portion for operating said control valves, and a member operatively connected to said last mentioned means disposed at the side of said main body portion.

2. A torch structure having in combination, a body or handle portion having front and rear ends, means for attaching a tip holding section to the front end of said portion, an end member secured to the rear end of said portion, a pair of regulating valves mounted in said end member constructed and arranged for fine and accurate adjustment and to maintain said adjustment, a pair of control valves disposed in said end member between said regulating valves and said body portion, means carried by said body portion and projecting at the side thereof for operating said control valves, said last mentioned means comprising an actuating member slidable within said body portion and a rocker member engageable from without said body portion.

3. A torch adapted to use oxygen and acetylene having in combination, a handle or body portion having front and rear ends, a mixing chamber at the front end of said body portion, a pair of control valves adapted to control the gases used at the rear end of said body portion, passages leading respectively from said control valves to said mixing chamber, said passages being of large diameter whereby expansion of the gases is permitted after leaving said control valves when the latter are opened.

4. The structure set forth in claim 3, a comparatively small passage leading from one of said passages to the mixing chamber through which the oxygen passes and a much larger passage leading from the other of said first mentioned passages to the mixing chamber through which the acetylene passes.

5. A torch having in combination, a main body portion, an end member removably secured thereto, a pair of regulating valves in the rear portion of said end member arranged for fine and accurate adjustment, a pair of valve chambers disposed wholly in said end member, spring-pressed control valves mounted in said valve chambers and accessible from the forward end of said end member and means for operating said control valves, including elements extending forwardly of said end member.

6. A torch for using acetylene and a combustion supporting gas having in combination, a body or handle portion, an end member secured thereto, a pair of valve chambers in said end portion disposed side by side, a pair of control valves mounted in said valve chambers, a mixing chamber in the forward end of said body portion, passages extending from points adjacent said control valves to said mixing chamber, said passages having communication with said valve chambers through lateral ports in said valve chambers disposed forwardly of said valves.

In testimony whereof I affix my signature.

LORN CAMPBELL, Jr.